United States Patent [19]

Massagli et al.

[11] 3,759,646
[45] Sept. 18, 1973

[54] MACHINE FOR PRODUCING SANDWICHED PLASTIC FOAM SHEET METAL PANELS

[75] Inventors: Daniel Massagli, Covina; Marino Ralph Massagli, Claremont, both of Calif.

[73] Assignee: True-Lok Metal Fabricating Company, Inc., Los Angeles, Calif.

[22] Filed: Nov. 8, 1971

[21] Appl. No.: 196,600

Related U.S. Application Data

[62] Division of Ser. No. 955, Jan. 6, 1970, Pat. No. 3,643,306.

[52] U.S. Cl.................... 425/110, 264/47, 425/335, 425/337, 425/364
[51] Int. Cl............................................. B29c 27/14
[58] Field of Search ................ 425/4, 90, 110, 177, 425/329, 472, 364, 337, 335; 264/47; 198/162, 165

[56] References Cited
UNITED STATES PATENTS

| | | | |
|---|---|---|---|
| 2,853,725 | 9/1958 | Schoenberger, Jr. ............ | 198/165 X |
| 2,866,730 | 12/1958 | Potchen et al. ..................... | 154/100 |
| 2,975,470 | 3/1961 | Snelson et al. .................... | 425/329 X |
| 3,114,450 | 12/1963 | Beiler .............................. | 198/165 X |
| 3,155,220 | 11/1964 | Thorp ............................ | 198/165 X |
| 3,312,760 | 4/1967 | Berner ............................ | 425/329 X |
| 3,461,647 | 8/1969 | Haines ........................... | 198/162 X |

*Primary Examiner*—Richard Bernard Lazarus
*Attorney*—Joseph F. Cuneo

[57] ABSTRACT

A machine and process to continuously produce sandwiched sheet metal-rigid plastic foam panels provided with a metal forming unit, an injector for the plastic reactants, and an expansion confining apparatus, the foam forming reactants being introduced into that portion of the metal panel that is ahead of the location where the metal panel enters the expansion confining apparatus to allow the foam formed to start expanding prior to entry of the panel into the expansion confining apparatus, the expansion confining apparatus being provided with a cavity conforming to the cross sectional outline of the panel, that portion of the panel remaining in the cavity until full expansion has taken place before it is discharged from the confining apparatus.

11 Claims, 9 Drawing Figures

MACHINE FOR PRODUCING SANDWICHED PLASTIC FOAM SHEET METAL PANELS

This is a division of application Ser. No. 955, filed Jan. 6, 1970, now U.S. Pat. No. 3,643,306.

This invention relates to a so-called sandwich type panel construction that uses a foamed plastic filler to fill the space bounded by the confining walls of the metal skin, and in particular to a machine and process for producing such panels continuously, automatically, uniformly and economically.

One type of sandwiched panel that is known in the art comprises a sheet metal envelope that surrounds a preformed foamed plastic filler, the filler having a configuration corresponding to that of the metal covering. The preformed filler is usually cemented to the inner walls of the envelope by a suitable adhesive that adheres to both the metal and the filler. Such panels are formed one at a time and considerable difficulty has been experienced in satisfactorily cementing the envelope to the filler particularly when the panels are long or when the width of the panel is too small to permit easy access. This type of construction is very time consuming, is quite costly and frequently the resulting panels are not uniform so that when a number of these panels are assembled together, the final product does not present a uniform appearance.

The majority of sandwiched panel structures have been heretofore made by preforming the container and then injecting the requisite amount of the various plastic foaming components into the container through some form of injection device. The foam fills the voids as it expands and if the metal is properly treated, will adhere to the inner walls of the container. Where the containing envelope is made of sheet metal that is light in gage it becomes necessary to back up all surfaces of the metal container to prevent the pressure generated by the expanding foam from severely deforming the container. Where the container is made from very light gage metal, the pressure developed by the foam on expansion is sufficient to rupture the container. This occurs generally at the seam where the metal has been subjected to work stresses. The pressure generated by the expanding foam is greatly increased when the expansion occurs at elevated temperatures such as are recommended for producing a foam having the optimum cell size and physical properties. This type of panel would likewise have to be formed one at a time.

No existing process is capable of producing sandwiched panels economically, automatically and rapidly. Our invention makes it possible to accomplish all of these desirable results for the first time and in addition makes it possible to produce uniform panels.

It is a purpose of this invention to provide a machine and process for producing sandwiched metal and foamed plastic panels, in which the plastic filler bonds itself to the walls of the envelope as it sets up, the contour of the panels after expansion has stopped is uniform, the foam has the desired density, and the foam cells have the optimum cell structure and texture.

It is another purpose of this invention to make available a machine and process for producing sandwiched metal and plastic foam panels rapidly, continuously, economically and with a minimum of supervision from light gage sheet metal.

A further purpose of this invention is to provide an expansion confining apparatus that will continuously provide adequate backing for the thin gage sheet metal envelope during the entire period in which the foaming plastic reactants are undergoing expansion.

Another purpose of this invention is to provide an expansion confining apparatus that can be adapted to form panels of different transverse cross sectional configuration, by merely changing the cross sectional outline of the engaging surfaces that come in contact with the outer surfaces of the metal container or envelope, to conform to the outline of the specific panel envelope.

An added purpose of this invention is to provide a machine and process capable of making panels of any desired length and still maintain a uniform cross section throughout the length of the panel.

Our invention overcomes the problems hitherto encountered in forming uniform sandwiched sheet metal foamed plastic panels and further makes it possible to employ very light gage sheet metal of any composition desired to form that tubular metal shell or envelope. The panels produced are uniform in shape, size, and foam density and can be produced rapidly, continuously and economically. We accomplish this by feeding into the first or shaping portion of the machine metal from a roll of the selected sheet metal having the required width and thickness. The metal can be aluminum, steel, sheet iron or any other suitable metal. The metal in passing through the forming or shaping device is given the required bends and curves that will produce a container or envelope having the required configuration when the two sides of the metal sheet are locked together. A preferred form of forming or shaping device is a so-called roll-form apparatus that are well known in the metal trade. The different curves, bends and locking edges are formed in stages as the metal progresses through the various sections of the roll-form apparatus and at the last section the locking edges are rolled together to form a foam tight seam.

The foam forming plastic reactants are introduced into the formed and seamed metal envelope by means of a conduit or conduits that are inserted into the tubular metal container at a position preferably just ahead of the stage where the locking edges are rolled together to form the seam. These conduits or conduit, as the case may be, are extended into the container a sufficient distance beyond the station where the seam is rolled closed and will discharge the proper amount of foaming reactants at that point into the tubular container. The foam forming reactants may be premixed before entering the single conduit, in which case they will start expanding just prior to their being discharged into the tubular container, or the various reactants may be conducted to the mixing valve within the tubular container by separate conduits which enter the tubular container, and after being blended in the mixing valve which is located at the discharge point within the tubular container, are discharged into the tubular container and commence expanding. Since the tubular container is constantly moving forward, the discharged plastic foam forming reactants are uniformly distributed throughout the entire length of the tubular metal container and will insure the required amount of foam at each section of the finished panel.

The preferred foam forming plastic filler is a polyurethane rigid type foam, however, any other foam forming plastic mixtures that will produce a rigid foam can be substituted if desired.

The seamed panel with the required amount of foam forming ingredients is drawn into the expansion confining apparatus before the expanding foam has had the opportunity of generating appreciable pressure. The various sections of the panel will travel in and be confined by the expansion confining apparatus at a speed that will permit full expansion of the reactants to take place before that portion of the panel can exit from the expansion confining apparatus. The fully expanded sections continuously leave the expansion confining apparatus and when a required length has been discharged, that length of panel is cut from the continuous panel by a conventional cutting device and the cut panels are stored to allow the fully expanded foam to cure fully. For this purpose the cut panels may be removed to a curing chamber in which they will remain until the foam is fully cured.

The foregoing a subsequent detailed description of the machine and process can be better understood by referring to the accompanying illustrations in which.

Figures 7, 8, 9:
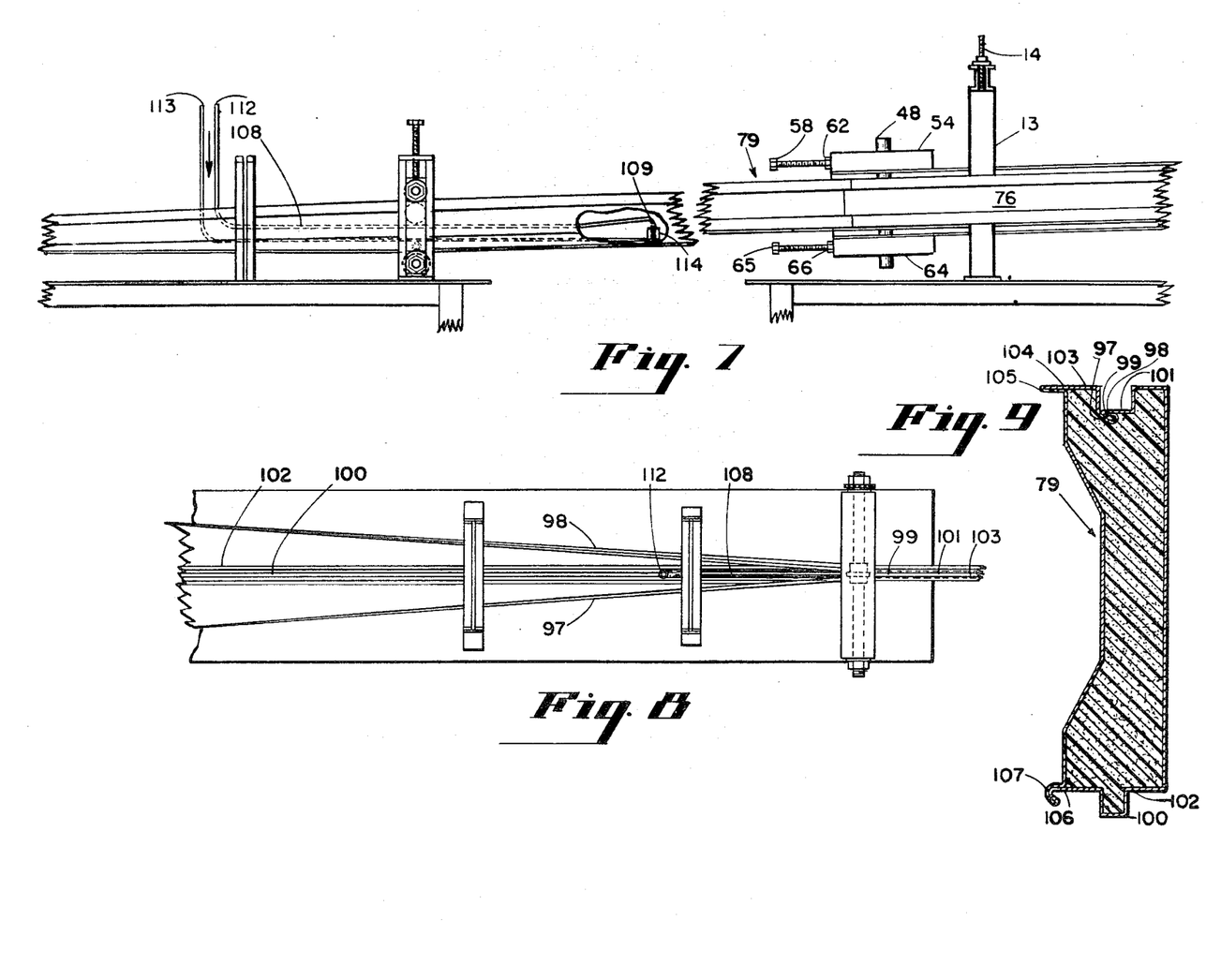
FIG. 7 is a broken side plan view of that portion of the machine that is included from the position just ahead of the seam locking mechanism and the forward portion of the expansion confining apparatus. Included in the drawing are the plastic reactants entry conduit or conduits and a portion of the continuous panel before and after it has been formed into a tubular seamed container; a portion of the panel has been cut away below the position where the seam is closed to show the position where the conduit discharges the mixed reactants.
FIG. 8 is a top plan view showing the end of the roll-form apparatus where the seam locking mechanism is located. Also included in the illustration is a portion of the continuous panel as it appears during the bending stages as it is formed into a panel before and after the edges are locked and the seam is formed. The point at which the plastic reactant conduit or conduits enter the formed but unseamed panel is also shown.
FIG. 9 is a transverse cross sectional view of an exemplary form of finished panel such as would be formed by the belts shown in FIGS. 1 and 2.

Roll-form machines are well known in the metal trade and are used to continuously form many types of sheet metal products, therefore only the rear portion of a roll-form assembly has been shown in FIGS. 7 and 8 to illustrate the relationship of the roll-form apparatus to the rest of the machine. The plastic reactant conduit or conduits enter the tubular envelope made by the roll-form apparatus at the position where the preformed envelope is about to undergo the locking and rolling of the seam; the conduit or conduits discharge the mixed plastic reactants at a position that is located downstream from the point at which the tubular envelope is closed.

Figures 1, 2, 3:
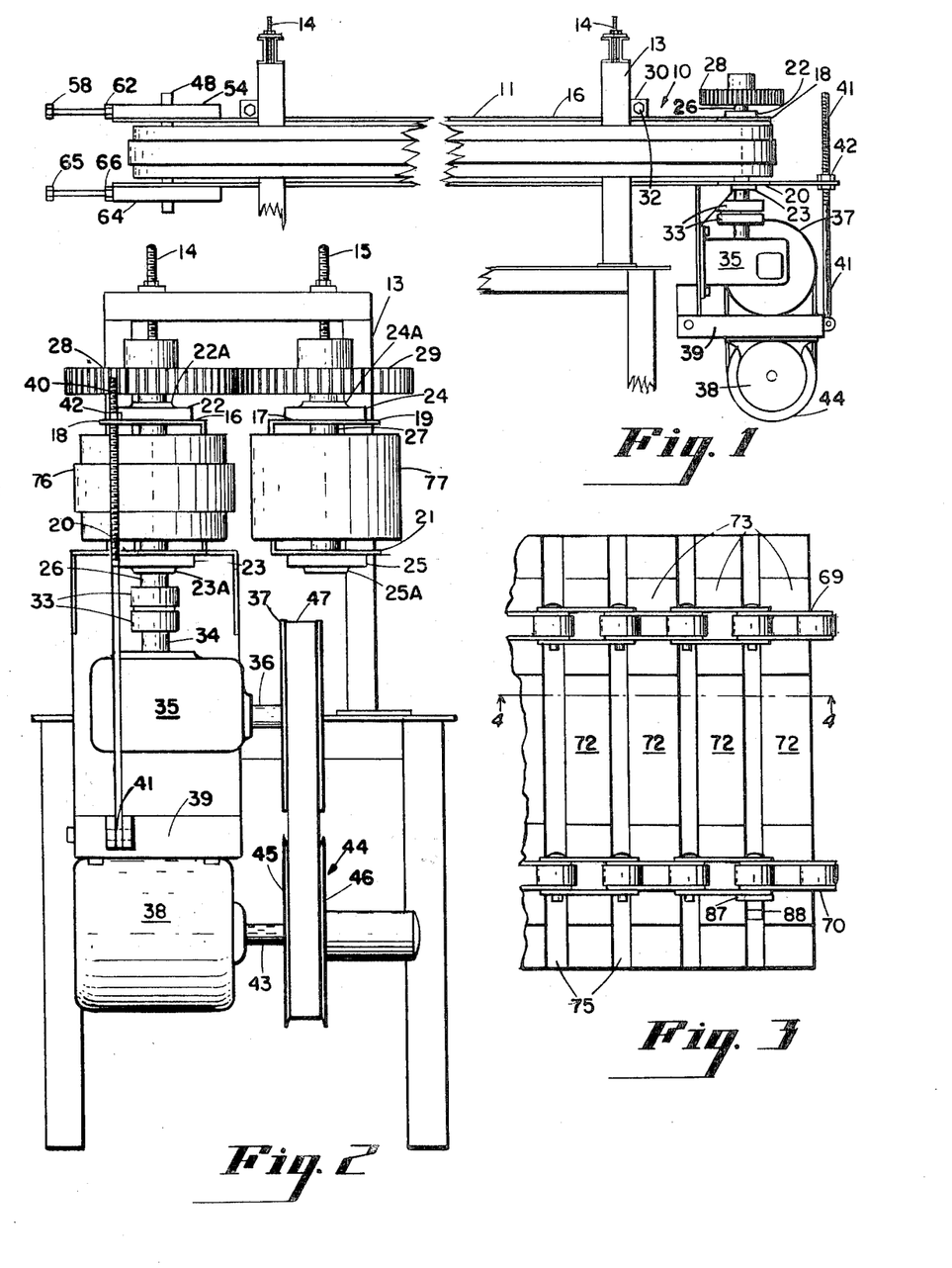
FIG. 1 is a broken, side plan view of the confining apparatus portion of the machine according to this invention.
FIG. 2 is an enlarged end plan view of the apparatus shown in FIG. 1 as it appears from the right end and showing an exemplary form of driving and synchronizing mechanism.
FIG. 3 is a side plan view of a portion of one belt with the metal straps secured to a pair of roller chains, the metal straps being in spaced relationship with each other and the roller chains brackets being secured near the upper and the lower portion of the metal straps.

FIGS. 1 and 2 show the longitudinal supporting framework 10 preferably comprising a pair of elongate rigid support members or structural members 11 and 12 which for the sake of illustration and simplicity are shown as two channels having the required length and width. Channels 11 and 12 are assembled so that their wide flat back portions are in spaced relationship with each other and these channels are substantially parallel. Main framework 10 is supported by a plurality of vertical, preferably rectangular supports 13 that are each provided with adjusting screws 14 and 15, screw 14 being rotatably attached to upper flange 16 of channel 11 and screw 15 being rotatably attached to upper flange 17 of channel 12. This arrangement permits either channel to be raised or lowered to its respective required position, and to correctly aline both belts of the expansion confining apparatus.

The upper right end portions of channels 11 and 12 are provided with upper and lower flange extensions 18 and 19, and 20 and 21 respectively. Each extension serves to support one of the horizontally positioned bearing supports 22, 23, 24, and 25. Each bearing support is provided with a suitable bearing designated as 22A, 23A, 24A, and 25A respectively. These bearings may be roller, ball, sleeve, or any other suitable type of bearing. Bearings 22A and 23A in retainers 22 and 23 respectively support drive shaft 26 so that it can rotate and bearings 24A and 25A in retainers 24 and 25 respectively rotatably support the upper and lower end portions of driven shaft 27. Shafts 26 and 27 are supported parallel to the respective back of channel 11 and 12 when assembled in their respective bearings and bearing supports and are parallel to each other. Shaft 26 has secured to its upper end, by any suitable means such as a key, set screw or set screws, splines or other suitable means, the hub of a spur gear 28, and similarly secured to the upper end of shaft 27 is the hub of a spur gear 29. Gears 28 and 29 are of identical pitch diameter and are both provided with the same number of teeth. The diameters of the spur gears are such that the gears will mesh properly when the backs of channels 11 and 12 have been correctly spaced apart by means of the adjusting brackets 30 and 31 secured to upper flanges 16 and 17 respectively and adjusting screw 32.

Shaft 26 is connected at its free end to one side of coupling 33, while the other side of coupling 33 is connected to output shaft 34 of a speed reducer 35. Input shaft 36 of speed reducer 35 is secured to a pulley 37 by means of a key, spline, set screws or other suitable securing device. A prime mover 38 such as an electric motor, internal combustion engine or other driving mechanism is secured to a pivotal base 39 whose position is regulated by a screw 40 having its end 41 pivotally secured to the free end of base 39. The upper end portion of screw 40 passes through a suitable orifice in flange extension 18 and the position of base 39 is adjusted by a regulating nut 42 that is threaded on screw 40. Shaft 43 of prime mover 38 is preferably secured to an adjustable width pulley 44 by means of a key, splines, set screws or the like, and is of a type that is readily available and well known in the trade. This pulley has cooperating conical shaped sides 45 and 46 against which the belt rides and adjusting the space between sides 45 and 46 controls the diameter at which the belt functions. Adjustable width pulley 44 is connected to a fixed width pulley 37 by a belt 47. This arrangement makes possible and available a wide range of speeds by simply varying the gap between conical sides 45 and 46.

Shafts 48 and 49 are located at the opposite end of framework 10 and the upper ends of shafts 48 and 49 are rotatably supported by suitable bearings 50 and 51 respectively. These bearings may be roller, ball, sleeve, bronze or other adequate type of bearing. Bearing housings 52 and 53 support bearings 50 and 51 respectively and are slidably mounted in suitable frames, preferably rectangular designated as 54 and 55 respectively. Frames 54 and 55 are rigidly secured to upper flanges 16 and 17 respectively by their inner members 56 and 57 respectively by any suitable means such as welding, brazing, bolting or other conventional means. A pair of adjusting bolts 58 and 59 are rotatably mounted in each end on member 60 and 61 of the frames respectively and their position is secured by lock nuts 62 and 63 respectively.

Figure 5:
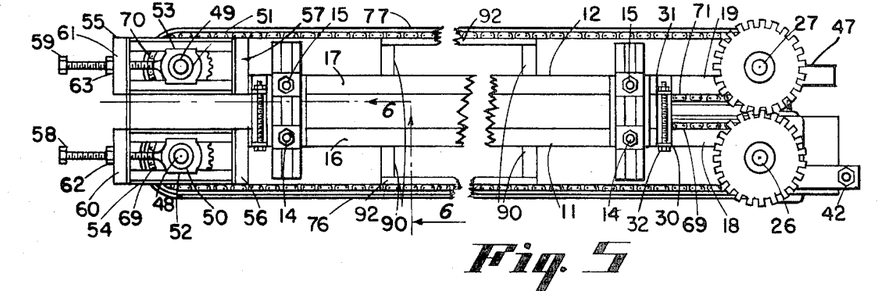
FIG. 5 is a broken top plan view of the expansion confining apparatus shown in FIGS. 1 and 2.

The lower ends of shafts 48 and 49 are also supported by bearings (not shown) that are mounted in bearing retainers (also not shown). These bearings are similar to bearings 50 and 51 and the bearing retainers are the same as bearing retainers 52 and 53 in construction. These bearing retainers are also slidably mounted in preferably rectangular frames similar to frames 54 and 55 that have inner members corresponding to inner member 56 and 57 of the upper frames and are secured to the lower flanges of channels 11 and 12 respectively. FIG. 1 shows lower rectangular frame 64 that corresponds and cooperates with upper frame 54 and slidably supports its respective lower bearing and bearing retainer (not shown) on which the lower end of shaft 48 is mounted. The lower frame for supporting the lower bearing and bearing support on which the lower end of shaft 49 is rotatably mounted does not appear in either FIGS. 1 or 5 since it is hidden by frame 55 in one instance and lies behind frame 64 in the other view. Frame 64 as well as the cooperating lower frame that supports the lower bearing and bearing retainer for shaft 49 are both provided with a rotatably mounted adjusting bolt and lock nut. The bolt in frame 64 is designated as 65 and the lock nut by 66.

Figure 6:
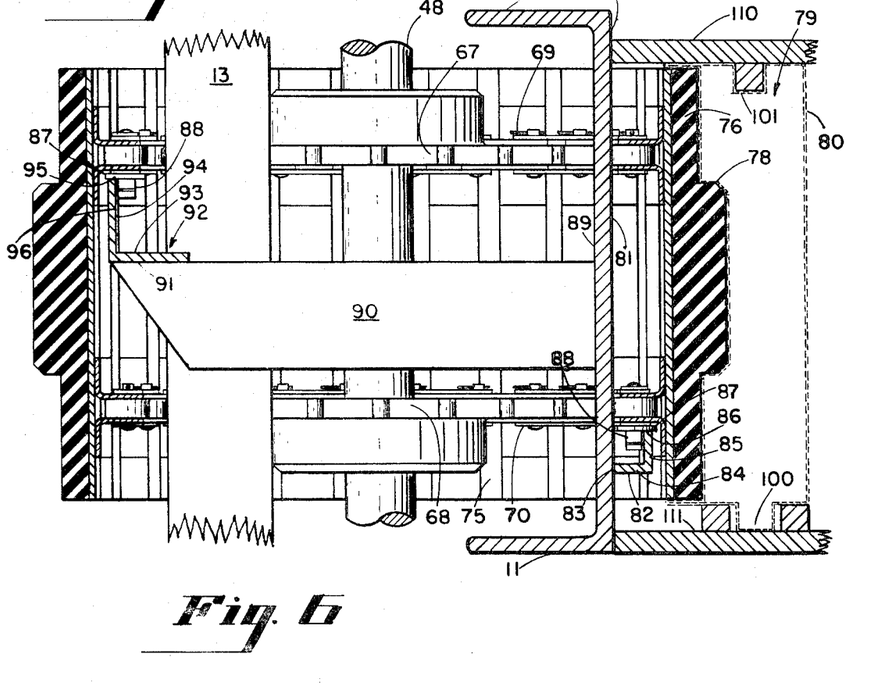
FIG. 6 is a view partly in cross section taken on the line 6 — 6 of FIG. 5 showing how the belt and its respective chain are driven by the respective sprockets that are secured to cooperating shafts. The shaft portion shown in this illustration shows the central portion of a shaft which is located at the left hand portion of the lower belt shown in FIG. 5.

Shafts 26, 27, 48 and 49 have each secured to them preferably, an upper and a lower chain sprocket 67 and 68. To avoid unnecessary duplication and superfluous drawings only the assembly of shaft 48 is shown in FIG. 6; the assembly of sprockets, chains, and belt supports is identically the same for all four shafts. FIG. 6 shows shaft 48 having sprockets 67 and 68 secured to the shaft in spaced relationship with each other, by any suitable means such as keys, set screws or other suitable positive securing means. A pair of chains 69 and 70 in the form of endless loops and having links adapted to properly engage the teeth of sprockets 67 and 68 respectively, connect their respective sprocket with a pair of sprockets secured in a like manner to drive shaft 26 at the opposite end of supporting channel 11; this arrangement causes shaft 48 to revo've the same as shaft 26. Corresponding pairs of sprockets are also secured to shafts 27 and 49 are are also connected together by a pair of chains similar to chains 69 and 70. Since shaft 27 is provided with gear 29 that is in mesh with gear 28, any movement imparted to chains 69 and 70 will be equally imparted to chain 71 and its cooperating lower chain (not shown, causing both chains to travel at the same speed but the rotation of shaft 26 will be counter to the rotation of shaft 27.

Figure 4:
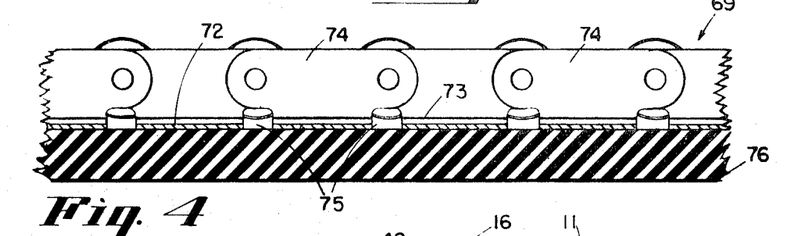
FIG. 4 is a cross sectional view taken on the line 4 — 4 of FIG. 3 to more clearly illustrate the arrangement of belt, metal straps and the chain elements that rotatably support the rollers.

A preferred form of belt supporting mechanism is shown in FIGS. 3 and 4 which more clearly show the construction of chains 69 and 70. Cleats 72 are rigidly secured to base 73 of each chain link 74 of the chains 69 and 70 as well as the other two chains by welding, brazing, bolting, riveting, or other suitable means, and the spacing on cleats 72 of the chains is adjusted to correspond to the spacing between sprockets 67 and 68. Cleats 72 extend beyond both chains 69 and 70 a predetermined distance, and the cleats are spaced a uniform distance apart leaving a gap 75 between each pair of cleats. An endless belt of elastomeric material that is tough, resilient and capable of withstanding work fatigue, is securely bonded to cleats 72 of the chains by a suitable adhesive cement or by imbedding the cleats in the elastomeric belt material at the time the belt is formed. The belt is designated as 76 and is operated by chains 69 and 70. The elastomeric material of the belt is preferably a synthetic rubber of suitable grade and hardness such as for example neoprene, a product that is readily available in the market. A second endless belt 77 of the same elastomeric material as belt 76 is likewise bonded to the cleats that support chain 71 and its lower cooperating chain. Belt 76 is shown in FIGS. 1, 2, and 6 as having a contour adapted to conform to the depressed side 78 of panel 79 shown both by the dotted lines indicating a panel at the right hand side of FIG. 6 and the view of the panel cross section in FIG. 9. Belt 77 contacts the smooth side 80 of panel 79 and is therefore flat in outline. It is to be understood that belts 76 and 77 can have any other desired cross sectional configuration to conform with any other outline of tubular container desired.

Chains 69 and 70 and their attached cleats 72 and belts 76 and 77 are usually quite long and the weight of each belt assembly is substantial so that it would be impossible to expect the sprockets on the respective pair of cooperating shafts to adequately support their respective chain and belt assembly particularly at the point that is midway between cooperating pairs of sprockets, without substantial sagging. Sagging at this position is avoided by providing one or more supporting arrangements on each side of the respective channel 11 and 12. FIG. 6 shows one manner of accomplishing this. Flat inner face 81 of channel 11 is equipped with an outwardly extending tracklike member 82, preferably in the form of an elongated angle that has edge 83 of horizontal flange 84 rigidly secured to face 81 of channel supporting member by welding, brazing, or other suitable means, or by forming the supporting member with this angular projection at the time it is made. Tracklike member 82 is positioned so that vertical flange 85 extends upwardly and its upper edge 86 provides a narrow rail on which the flat surface of a washer 87 can travel. Chain 70 is provided at uniformly spaced intervals along its entire length with elongated pins 88 on which washers 87 are rotatably supported when they are adjacent the lower side of the respective chain link. That portion of elongated pin 88 extending below washer 87 can engage the inner surface of vertical flange 85 and thereby prevent the chain from swinging away from edge 86 while it is travelling in the region where tracklike member 82 is located. The drawing shows tracklike member 82 located near the bottom of main supporting member 11 and since it is located below chain 70 it is easily accessible should the need arise for inspection or repairs.

Surface 89 of channel 11 that lies between the upper and lower flanges of the channel member has attached to it, at a position preferably located between sprockets 67 and 68, two or more outwardly extending supporting cross members 90 that are securely attached at one end to surface 89 by any suitable means such as welding, brazing, bolting or the like. Cross members 90 may be of any rigid structural member such as a tube, square, rectangular, channel, T-section or the like. The one shown in the illustration by way of example and convenience is a square tubular member. Cross members 90 extend outwardly from surface 89 to a point beyond the vertical member of vertical main frame supporting member 13 and each cross member 90 has secured to its outer extremity 91 a tracklike member 92, such as for example an angle member, whose horizontal flange 93, preferably extending inwardly, is welded, brazed, bolted or otherwise securely attached to the outer extremity of each cross member 90. Vertical upwardly extending flange 94 has an upper edge 95 that provides a track surface on which the lower surface of washers 87 of the upper chain can ride. Upper chain 69 is also provided at uniformly spaced intervals along its entire length with elongated pins 88 that likewise contact inner surface 96 of flange 94 and prevent the chain from swinging away from track 95 at all times. Flange 94 will at all times be between pins 88 and the corresponding base portion of the appropriate line 74. The chains that are associated with channel member 12 are also provided with corresponding tracks that are supported in the same manner as those of channel 11.

FIG. 9, by way of example, shows a form of continuous enclosing metal envelope of panel 79 such as would be formed by the machine shown in the illustrations. The metal sheet from a roll of required width and thickness is bent and formed to give it the desired configuration and formed edges 97 and 98 at the sides of the continuous sheet are locked together to form seam 99. The finished panel has a tongue 100 and a groove 101 located at the opposed narrow sides 102 and 103 respectively. To insure a leakproff construction edge 104 of side 103 is provided with a projection 105 while side 102 is provided with a curved nesting projection 107 extending from edge 106. Projection 105 will seat in projection 107 when tongue 100 and groove 101 of a corresponding adjacent panel are properly engaged.

FIG. 7 shows a side plan view of the seam forming end of a roll-form unit and includes the mixed plastic foam forming reactants conduit 108 that enters the tubular envelope at a location that is just ahead of the seam forming rolls that lock and compress the edges of the formed envelope into a liquid tight seam. Downstream from the seam forming rolls a portion of the formed panel is shown cut away to more clearly indicate the position at which discharge end 109 of conduit 108 introduces the mixed foam producing reactants into the tubular envelope. Shortly after the foam producing reactants are introduced into tubular envelope of the panel, the panel enters the expansion confining apparatus and is received between belts 76 and 77. The injected plastic foaming reactants, having entered the tubular shell expand while the shell is confined to the limits defined by the belts and by upper plate 110 and lower plate 111 shown in FIG. 6 secured to respective adjacent edges of the elongate support members. The first plate receives the groove and the second plate receives the tongue of the panel, these plates serve to prevent the narrow opposed sides of the panel from deforming. The pressure generated by the expanding foam is quite high and without proper backing on all sides the panel, particularly one made of light gage metal, would rupture or break the seam and permit the expanding foaming ingredients to escape from the tubular envelope.

The expanding foam forces the wide sides of the metal tubular envelope so tightly against belts 76 and 77 that it is drawn by the moving belts through the entire expansion confining apparatus without slippage even though the tongue and groove sides of the panel are sliding over fixed forming plates 110 and 111. While the tubular metal envelope is traveling with the belts it exerts sufficient pull to unwind the metal sheet from the roll of metal at the beginning of the machine and draw the metal through the various roll stages of the roll-form apparatus including the seam locking and pressing rolls. This eliminates the necessity of providing a drive to operate the rolls of the roll-form apparatus, such a drive would have to be synchronized exactly to move the metal sheet through the various stages of the roll-form apparatus at the same speed as the metal envelope travels with belts 76 and 77 to prevent the closed tubular container between the roll-form apparatus and the expansion confining apparatus from buckling or tearing.

When the reaction time in which the foam forming plastic reactants reach full expansion is rapid, it is preferred to introduce the reactants separately into the panel through individual conduits and allow these reactants to mix and react at a position adjoining the discharge point indicated by FIG. 7 as numeral 109. This avoids causing the reacting ingredients from traveling through a long conduit and prevents possible blocking of the discharge due to accumulated layers of reacted or partially reacted foam adhering to the wall of the conduit.

FIG. 8 shows the locking end of the roll-form apparatus viewed from above and illustrates the progressive stages of the formation of a completely enclosed tubular envelope from the stage when the long opposing sides are at a slight angle in the metal sheet with the narrow tongue supporting side until the long sides have assumed a substantially 90° position thereto as they enter the engaging rolls that cause the preformed edges of the sheet of metal to become locked and then press them into flat seam 99. The entry end 112 of conduit or conduits 108 is shown in its preferred position just upstream from the seam closing device where preformed edges 97 and 98 are not locked together.

The bond between the plastic foam and the inner walls of the tubular metal envelope is greatly improved if the mixed foam forming reactants are placed in contact with the entire internal surface of the container, which has been properly treated and cleaned, while they are still in the fluid state that exists at the time of discharge. A preferred manner of accomplishing this is to provide a compressed air conduit 113 having a plurality of discharge orifices 114 directed to spray the discharged foam producing mixture of reactants to all of the inner surfaces of the metal envelope.

The manner in which the panel forming process is carried out is as follows: a roll of prepared sheet metal of the desired width and thickness is mounted on a delivery reel. The metal may have been painted on the outer surface before it has been placed on the roll and the inner surface has been cleaned and preferably treated with a suitable corrosion preventative that is compatible to the mixed but slightly reacted foam forming plastic reactants, to insure a good bond between the metal and the plastic foam filler after the foam has reacted and cured.

The metal sheet unwinds from the coil and is drawn through the various form-roll stages where it acquires the shape of the finished panel walls. The panel is formed from the flat horizontal sheet and when it is folded will preferably be positioned in the roll-form apparatus so that the wide sides are vertical and the narrow sides that form the tongue and groove portions of the panel are horizontally positioned at the top and bottom. During the roll-form process the edges of th metal sheet are formed into cooperating locking edges which are at a later stage locked together and ultimately pressed together to form a longitudinally extending seam for the entire length of panel produced. Prior to locking the edges a length of conduit or conduits enters the formed shell and extends into the shell to a position that is well downstream of the point of entry where the tubular container is sealed. The end of the conduit discharges the mixed foam-producing plastic reactants into the container and this mixture falls to the bottom of the container at a position that shortly precedes the entrance of the closed tubular container into the expansion confining apparatus. A proportioning dispenser meters the correct amount of each reactant to produce the final weight of foam desired in each foot of the finished panel. These proportioning devices are well known in the art and may be located either outside the tubular container or if desired may be positioned inside the tubular container at a position that just precedes the point of discharge of the mixed reactants. In the first instance a single conduit is required to conduct the mixed reactants to the point of discharge while in the second alternative the separate reactants are conducted to the proportioning and mixing device, the conduits for the individual reactants being smaller in diameter than the single conduit used in the first instance.

The mixture will start reacting and expanding shortly after it has been discharged and by the time the closed panel reaches the entrance of the confining apparatus the expansion will be well in progress and substantially all of the voids will be filled with the expanding foam. The foam continues to expand after all voids are filled and this generates pressures that if not confined by the belts and sides of the expansion confining apparatus would be sufficient to rupture the metal skin of the tubular container, particularly at the rolled seam joining the two locking sides.

A good bond is required between the inner walls of the tubular container and the expanded foam. This is greatly improved by making certain that the wet discharged foam from the conduit is uniformly distributed throughout the panel since the wet foam before it has started to expand appreciably will stick better to the prepared internal surfaces of the tubular container. A preferred way of insuring thorough distribution of the wet unexpanded mixture as it is discharged from the conduit at the end of the mixing and proportioning device is to provide at the point of discharge a plurality of air jets that are in the form of a spray and carry the unexpanded wet mixture to substantially all of the walls of the container at the time of entry. If this is not done the foam will start to form in the lower end of the tubular container and will rise upwardly as the foam fills the void, however, the expanding foam starts immediately to form a skin on the surface and by the time it reaches the upper end of the tubular container the skin will have partly set preventing that portion of the foam from producing a good bond with the wall of the container.

The prime mover driving shaft 26 causes it to revolve driving belts 76 and 77 through the linking mechanism that causes each belt to move in the same direction as the other and at the same speed. The variable width cone pulley 44 permits a wide range of speeds even through the speed of the prime mover is fixed in the apparatus shown in the drawings. If desired a variable speed prime mover could be employed however for simplicity of illustration this has not been used in the illustrations. Likewise any other conventional means for synchronizing the motion of the belts may be employed if desired.

The expanding foam, once it has filled the container, generates considerable pressure and forces the panel tightly, particularly on the wide sides, against the surfaces of belts 76 and 77. This has the effect of pulling the formed tubular shell through to the end of the expansion device and since the tubular shell is an integral part of the unformed metal sheet on the spool it has the pull sufficient to cause the metal to unwind from the spool and pull it through all of the various stages of the roll-form apparatus. This conveniently eliminates the necessity of providing a synchronous drive for the roll-form apparatus. Again a separate drive for the roll-form apparatus may be employed if desired, however, such a drive must be carefully synchronized with the speed of the expansion confining apparatus otherwise the panel will buckle between the expansion confining apparatus and the end of the roll-form apparatus, if the speed of the former is slower than the speed of the latter, or the panel will be stretched and possibly torn if the reverse condition prevails.

The expanding plastic foam remains in the confining apparatus until the plastic foam has completed its expansion phase and the foam in the panel has started to cure. The foam filled portion of the tubular container that has fully expanded is now ready to leave the expansion confining apparatus and when a sufficient length of fully expanded and partially cured foamed panel has exited from the expansion confining apparatus, it is cut to the required length from the portion that is just out of the expansion confining apparatus, and the cut portion is stored to permit it to cure fully before it is used.

The injection of the foam forming plastic reactants into the tubular container may be either continuous or intermittent as desired. Where the injection is continuous the amounts of reactants introduced into the mixer valve are controlled by the rate at which the expansion confining apparatus is traveling and if properly metered will produce a foam having the required density per cubic foot. The intermittent injection of the foam producing mixture is accurately timed and controlled by any one of a number of suitable means, for example; electric limit switches that control the timing of the discharge period; a timer operated mixer valve that can be adjusted to allow the mixture to escape from the mixer valve at predetermined intervals; or the timing of the discharges from the mixer valve can be regulated by cams that open and close the outlet port at the required intervals. Any of the above devices capable of accurately controlling the volume of mixture discharged at the required time may be employed. The discharge from the mixer valve flows through conduit 108 which may be long or very short depending on whether the mixer valve is located inside the panel or outside before the conduit enters the unclosed panel. The discharge end of conduit 108 is positioned within the tubular container as shown in the illustration.

It is intended that any rigid type of plastic foam may be employed to fill the tubular container which has been formed, however, the preferred plastic foam is a rigid polyurethane foam. The reacting components which are an organic isocyanate resin serving as one of the reacting ingredients and a polyalcohol, polyether, or polyester resin as the other reacting ingredient, in conjunction with a suitable blowing agent such as difluorodichloromethane which is readily available on the market under the trade name of "FREON 12," and widely used in the refrigeration industry and related arts, are mixed and discharged into conduit 108 and discharged from the end of the conduit into the tubular container. The heat generated by the reacting ingredients acts on the "FREON 12" and converts it into a gas under pressure and escapes through the reacting ingredients causing them to foam. This reaction occurs in a relatively short time and generates pressure that will force the foaming mixture into all the voids within the container shell. The reaction and polymerization of the mixed ingredients may be greatly accelerated by conducting the operation at elevated temperatures, for example 130° F. This temperature greatly shortens the time required for full reaction to occur and the expansion of the foam within the panel will have been completed before that portion of the panel is ready to be discharged from the expansion confining apparatus.

Curing of the foam requires a considerably longer period of time therefore, the desired lengths of fully expanded sandwiched panel are cut from the panel that has left the confining apparatus and are stored a sufficient time to permit the foam to cure fully before they are ready for use.

While one embodiment of the expansion confining apparatus and several modifications thereof have been described in detail herein, various changes and further modifications may be made without departing from the scope of this invention. We claim:

1. Apparatus for confining the expansion of foam-forming plastic reactants after the reactants have been introduced into a tubular sheet metal container that is being continuously formed, in the production of rigid, laminated articles, and for holding the shape of the formed container, comprising a pair of elongate, parallel, spaced apart support members, support means connected with the support members supporting the support members on a supporting surface, bearing means on opposite ends of each of the elongate support members, four parallel rotatable axle means mounted in the bearing means at opposite ends of the support members at substantially a right angle to the longitudinal axis of the support members, with one axle means at one end of one of the support members connected to a drive means to be rotatably driven thereby, means interconnecting said one axle means with an adjacent axle means at an adjacent end of the other support member to transmit corresponding but opposite rotation from said one axle means to the adjacent axle means, pulley means on each of the axle means intermediate the ends thereof and in the plane of the support members, endless belt means disposed about the pulley means at opposite ends of each support member with one flight of each belt means extending between and parallel to the support members and with said flights spaced apart a predetermined distance to receive and engage opposite sides of an article therebetween, said belt means having a predetermined cross-sectional configuration conforming to a predetermined cross-sectional configuration of the sides of the article engaged between the belt means, and stationary, fixed plate means at opposite sides of the belt means spaced apart a predetermined distance to engage and confine the opposite edges of the article engaged between the belt means.

2. Apparatus as in claim 1, wherein said pulley means comprises substantially identical sprockets, and said belt means comprises link chain means disposed about said sprockets, and an elastomeric endless belt secured to said link chain means, said elastomeric belt engaging the article.

3. Apparatus as in claim 1, wherein said plate means are secured to adjacent corresponding respective opposite edges of the elongate support members in spanning relation to the space between the support members and extend substantially the entire length of the support members.

4. Apparatus as in claim 1, wherein said means interconnecting said one axle means with said adjacent axle means comprises substantially identical gears secured to the respective axles and meshed with one another.

5. Apparatus as in claim 1, wherein said pulley means comprises substantially identical sprockets, and said belt means comprises link chain means disposed about said sprockets and an elastomeric endless belt secured to said link chain means, said elastomeric belt engaging the article, said plate means secured to adjacent corresponding respective opposite edges of the elongate support members in spanning relation to the space between the support members and extending substantially the entire length of the support members, and said means interconnecting said one axle means with said adjacent axle means comprising substantially identical gears secured to the respective axles and meshed with one another.

6. Apparatus as in claim 5, wherein adjustment means is connected with said support members to adjust the position of the support members in the direction of the axes of the axle means whereby the belt means may be aligned with one another, and adjustment means is connected with the bearing means at one end of the support members to adjust the position of the bearing means and thus the axle means supported therein in the direction of a longitudinal axis of the support members to adjust the tension on the belt means.

7. Apparatus as in claim 6, wherein said bearings are mounted in bearing support means, including fixed bearing support means secured to opposite sides of one end of each of the elongate support members and adjustable bearing support means adjustably secured to opposite sides of the other ends of said elongate support members, said axles being rotatably supported in the bearing means at the opposite sides of each end of each elongate support member.

8. Apparatus for confining the expansion of foam-forming plastic reactants after the reactants have been introduced into a tubular sheet metal container that is being continuously formed, in the production of rigid, laminated articles, and for holding the shape of the formed container, comprising a pair of elongate, parallel, spaced apart support members, support means connected with the support members supporting the support members on a supporting surface, bearing means on opposite ends of each of the eongate support members, four parallel rotatable axle means mounted in the bearing means at opposite ends of the support members at substantially a right angle to the longitudinal axis of the support members, with one axle means at one end of one of the support members connected to a drive means to be rotatably driven thereby, means interconnecting said one axle means with an adjacent axle means at an adjacent end of the other support member to transmit corresponding but opposite rotation from said one axle means to the adjacent axle means, pulley means on each of the axle means intermediate the ends thereof and in the plane of the support members, endless belt means disposed about the pulley means at opposite ends of each support member with one flight of each belt means extending between and parallel to the support members and with said flights spaced apart a predetermined distance to receive and engage opposite sides of an article therebetween, said belt means having a predetermined cross-sectional configuration conforming to a predetermined cross-sectional configuration of the sides of the article engaged between the belt means, adjustment means connected with said support means to adjust the position of the support members in the direction of the axes of the axle means whereby the belt means may be aligned with one another, and adjustment means connected with the bearing means at one end of the support members to adjust the position of the bearing means, and thus the axle means supported therein, in the direction of the longitudinal axis of the support members to adjust the tension on the belt means.

9. Apparatus as in claim 8, wherein said bearings are mounted in bearing support means, including fixed bearing support means secured to opposite sides of one end of each of the elongate support members and adjustable bearing support means adjustably secured to opposite sides of the other ends of said elongate support members, said axles being rotatably supported in the bearing means at the opposite sides of each end of each elongate support member.

10. Apparatus as in claim 9, wherein said pulley means comprises substantially identical sprockets, and said belt means comprises link chain means disposed about said sprockets and an elastomeric endless belt secured to said link chain means, said elastomeric belt engaging the article, and plate means secured to adjacent corresponding respective opposite edges of the elongate support members in spanning relation to the space between the support members and extending substantially the entire length of the support members, and said means interconnecting said one axle means with said adjacent axle means comprising substantially identical gears secured to the respective axles and meshed with one another.

11. Apparatus as in claim 8, wherein said pulley means comprises substantially identical sprockets, said belt means comprises link chain means dieposed about the sprockets and an elastomeric endless belt secured to the link chain means, said elastomeric belt engaging the article, a plurality of uniformly spaced rotatable track engaging and belt supporting means secured to said link chain means on the side thereof opposite said elastomeric belt, and elongate track means secured to adjacent sides of said elongate support members, said track engaging and belt supporting means on said link chain means operatively engaged with said track means to prevent sagging of said belt means between said sprockets and to maintain said belt means in substantially a straight line while said article is confined between said belt means.

* * * * *